May 2, 1933.  L. D. SOUBIER  1,906,650

GLASS CUTTING MECHANISM

Filed Nov. 14, 1930

Inventor
Leonard D. Soubier
By J. F. Rule
Attorney

Patented May 2, 1933 1,906,650

UNITED STATES PATENT OFFICE

LEONARD D. SOUBIER, OF ALTON, ILLINOIS, ASSIGNOR TO OWENS-ILLINOIS GLASS COMPANY, A CORPORATION OF OHIO

GLASS CUTTING MECHANISM

Application filed November 14, 1930. Serial No. 495,677.

My invention relates to apparatus for use in the manufacture of glass articles formed in molds, and particularly to mechanism cooperating with the molds for severing the mold charges of molten glass.

The invention as herein illustrated is adapted for use with a suction type of glass blowing machine comprising molds which are brought in succession to a gathering position over a tank or container for molten glass, and the charges of glass drawn into the molds by suction. Cutting mechanism is employed for severing the glass between the molds and the supply body. Although with machines of this type it is customary to mount the cutting mechanism on the traveling mold carriage, it has heretofore been proposed to provide a stationary cutter. With such construction, in which all of the molds are brought in rapid succession to the cutting position and the glass in each mold severed by the same cutting edge, difficulties are encountered owing to overheating of the cutter and excessive wear. This difficulty is augmented when it is attempted to use a stationary cutter with machines of the type in which plural molds are employed on each head or unit of the machine and the mold cavities are all arranged to travel in the same circular path, as shown, for example, in the patent to M. J. Owens, Number 1,547,439, granted July 28, 1925.

An object of the present invention is to provide a simple and practical form of cutting mechanism in which the cutter has a stationary mounting, which mechanism will overcome the difficulties above noted. To this end, the invention provides a cutter mounted to reciprocate in a stationary support and provided with a plurality of cutting edges. The cutter is reciprocated in a direction transverse to the direction in which the molds are traveling at the time the glass is severed, and the cutting edges operate in succession to sever the successive mold charges of glass.

Other objects of the invention will appear hereinafter.

Figure 1:
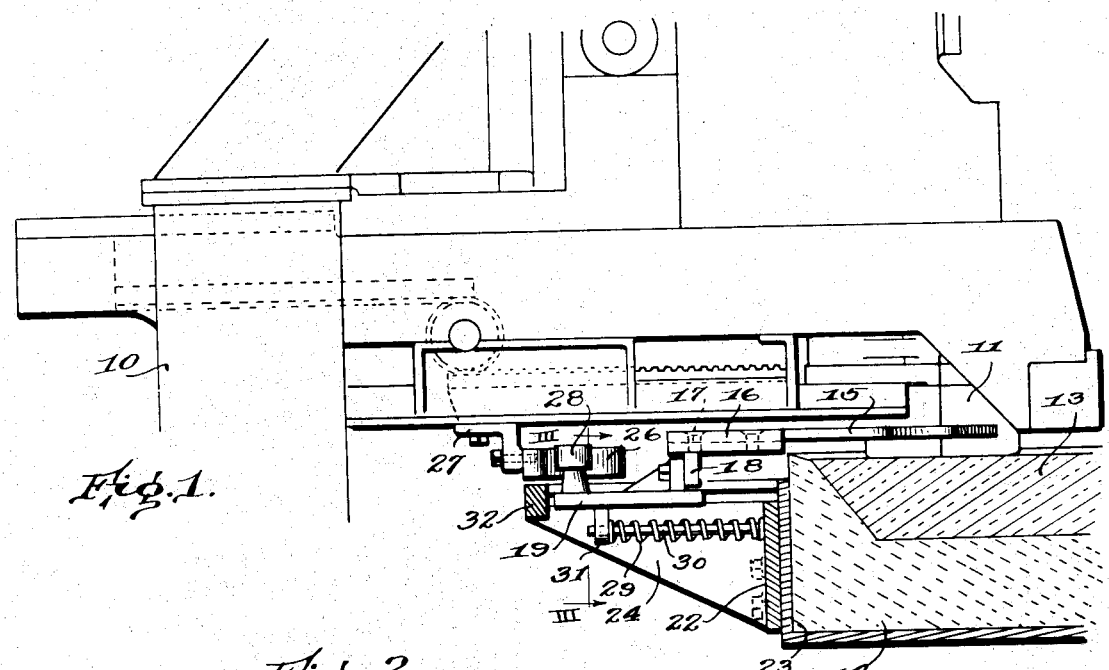
Fig. 1 is a fragmentary elevational view, partly in section, of a glass blowing machine and gathering tank, with the present invention applied thereto.
Figure 2:
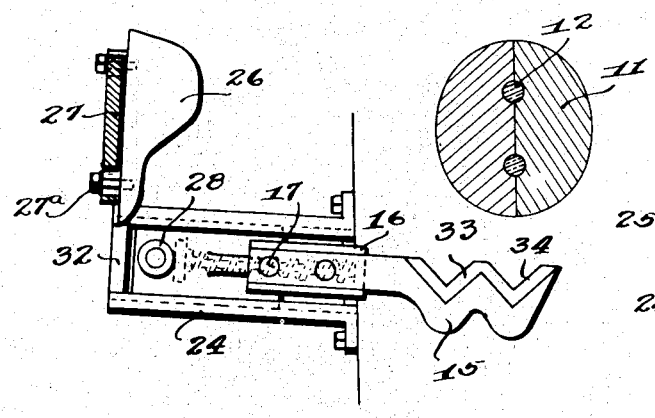
Fig. 2 is a sectional plan view showing the reciprocating cutter and its relation to a plural cavity mold.
Figure 3:
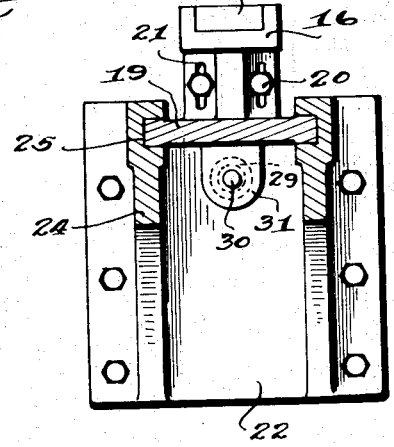
Fig. 3 is a sectional elevation at the line III—III on Fig. 1.

The glass blowing machine comprises a mold carriage 10 which may be mounted for continuous rotation about a vertical axis and on which are mounted a plurality of heads or units each carrying mold blocks or sections 11. Each mold block is formed with plural cavities 12 so that a plurality of molds are provided on each head or unit of the carriage. The mold cavities are preferably arranged at equal distances from the center of the mold carriage so that they all travel in the same circular path. The moldcarriage and parts carried thereby may be the same as more fully disclosed in the patent to Owens above identified. The charges of glass are drawn by suction into the molds from a supply body 13 of molten glass within a container 14 which may be either a rotating pot or a stationary container. As herein shown, the container is stationary and may comprise the usual forehearth extension of a glass melting and refining tank.

The mechanism for severing the glass comprises a cutter plate or blade 15, the shank of which fits in a channel shaped support 16 and is secured therein as by means of rivets 17. The support 16 is provided on its under side with a vertical extension 18 by means of which the cutter is attached to a slide block 19. Bolts 20 extending through vertical slots 21 in the slide block permit vertical adjustment of the cutter. As herein shown, the slide block is mounted on a yoke shaped bracket 22 bolted to the metal casing 23 which supports the container 14. The supporting bracket 22 comprises parallel arms 24 formed with horizontal guideways 25 in which the slide block 19 is mounted for reciprocation in a direction radial to the mold carriage.

The cutter is periodically reciprocated by means of cams 26 connected by brackets 27 to the mold carriage. The cams are connected to the brackets by bolts 27ª which extend through slots in the bracket, the slots being elongated to permit horizontal adjustment of the cams. A cam roll 28 on the slide block 19 runs on the cams and is held against the cams by a coil spring 29 mounted on a rod 30 attached to the bracket 22. The spring is held under compression at all times between said bracket and a lug 31 on the slide block, said lug being slidable on the rod 30. When the cam roll is out of contact with the cams the outward movement of the slide block is limited by a cross bar 32 which connects the outer ends of the arms 24. The cutter blade is provided with a plurality of V-shaped cutting edges 33 and 34.

Figures 4, 5:
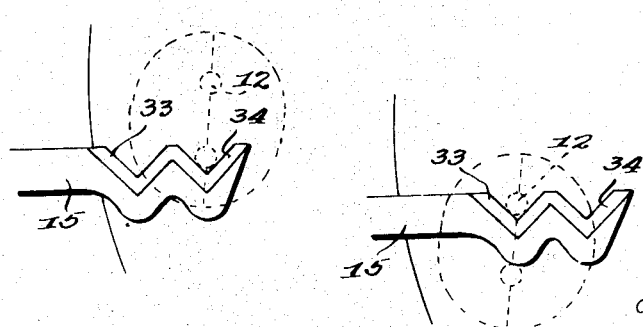
Figs. 4 and 5 are diagrammatic views showing the relative positions of the mold and cutter at the time of severance of two succeeding mold charges.

The operation is as follows:

As the mold carriage rotates, the molds 11 are brought in succession over the pool of glass 13 and filled by suction. Each mold after receiving its charge, is lifted, as usual, a short distance above the glass level, bringing the bottom end of the mold into the horizontal plane of the cutter 15. As the mold sweeps over the cutter, the outer V-shaped cutting edge 34 severs the glass in the first mold cavity as indicated in Fig. 4. The cam 26 then operates to move the cutter outwardly or away from the center of the machine so as to bring the next V cutting edge 33 into the path of travel of the mold cavities so that the second charge of glass is severed by the edge 33 as indicated in Fig. 5. The cam 26 then passes beyond the cam roll 28 and the cutter is returned by its spring 29 ready for a succeeding operation.

Although I have only shown two cutting sections or notches on the cutter blade, it will be understood that with machines in which a greater number of molds or mold cavities are provided on each head or unit the number of cutting notches may be correspondingly increased. It will be further understood that a cutting apparatus such as herein shown can be used with machines of the type in which but a single mold and mold cavity are provided on each head or unit, the cams 26 being shaped to successively bring the cutting notches into position for cooperation with successive molds.

It will be noted that the cutter blade, as herein shown, extends over the tank, so that the tails of glass severed from the mold are permitted to drop back into the container 14. Owing to the position of the knife, it is at all times subjected to a comparatively high temperature so that the rate of cooling between cutting operations is comparatively slow. By providing a plurality of cutting edges operating in alternation or succession, time allowed for cooling is increased and the danger of overheating is greatly reduced. By removing the bolts 20 the cutter blade can be quickly removed for repairs or replacement.

Modifications may be resorted to within the spirit and scope of my invention.

What I claim is:

1. The combination of a mold carriage rotatable about a vertical axis, molds thereon, cutting mechanism having a stationary mounting, said mechanism providing a plurality of cutting edges, and means controlled by the movement of the mold carriage to position said edges for operation singly and in succession for severing charges of glass in succeeding molds.

2. The combination of a mold carriage rotatable about a vertical axis, molds thereon arranged to travel in the same horizontal path, cutting mechanism mounted separately from the mold carriage and comprising a plurality of cutters, and means for bringing the cutters in succession to the same cutting position and causing said cutters to operate singly and in succession at said position to sever succeeding mold charges of glass.

3. The combination of a mold carriage rotatable about a vertical axis, molds thereon arranged to travel in the same horizontal path, cutting mechanism comprising a plurality of cutters having a stationary mounting, and mechanism controlled by the movement of the mold carriage to position said cutters in succession at the same cutting position and causing them to sever mold charges in succession at said position.

4. The combination of a mold carriage rotatable about a vertical axis, molds thereon, a cutter plate, a stationary support on which said plate is mounted for reciprocation in a direction transverse to the direction in which the molds travel past the cutting point, said cutter plate being provided with a plurality of cutting edges at different distances from the axis of the mold carriage, and cams on the mold carriage operative to bring said cutting edges in succession to position for severing charges of glass in the succeeding molds.

5. The combination of a mold carriage rotatable about a vertical axis, a container for molten glass, molds on the carriage arranged to travel over the glass in the container, a cutter extending over the glass in said container, a stationary support on which the cutter is mounted for reciprocation in a direction radial to the mold carriage, and cams on the mold carriage operative to reciprocate said cutter.

6. The combination of a mold carriage rotatable about a vertical axis, a container for molten glass, molds on the carriage arranged to travel over the glass in the container, a cutter extending over the glass in said container, a stationary support on which the cutter is mounted for reciprocation in a direction radial to the mold carriage, and cams on the mold carriage operative to reciprocate said cutter, said cutter being provided with a plurality of cutting notches brought in succession by said cams into position for severing the mold charges of glass in succeeding molds.

7. The combination of a mold carriage rotatable about a vertical axis, a container for molten glass, molds on the carriage arranged to travel over the glass in the container, a cutter extending over the glass in said container, a stationary support on which the cutter is mounted for reciprocation in a direction radial to the mold carriage, and cams on the mold carriage operative to reciprocate said cutter, said cutter being provided with a plurality of cutting notches, the molds being so arranged that the mold cavities travel in the same circular path, and said cams being shaped and operative to bring the cutting notches in succession into said path.

Signed at Alton, Illinois, this 4 day of November, 1930.

LEONARD D. SOUBIER.